United States Patent
Sendo et al.

(10) Patent No.: US 9,405,263 B2
(45) Date of Patent: Aug. 2, 2016

(54) IMAGE FORMING APPARATUS, IMAGE FORMING SYSTEM, AND POST PROCESSING METHOD

(75) Inventors: Hiroshi Sendo, Toyokawa (JP); Teruo Nagashima, Toyohashi (JP); Osamu Okada, Toyokawa (JP); Hideyuki Kurahashi, Toyokawa (JP); Kenji Tsuru, Hachioji (JP); Shigeo Nakamura, Okazaki (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 8 days.

(21) Appl. No.: 13/523,094

(22) Filed: Jun. 14, 2012

(65) Prior Publication Data

US 2012/0321365 A1    Dec. 20, 2012

(30) Foreign Application Priority Data

Jun. 16, 2011   (JP) ................... 2011-134532

(51) Int. Cl.
*G03G 15/00* (2006.01)
*G03G 21/00* (2006.01)
(Continued)

(52) U.S. Cl.
CPC ........ *G03G 21/1609* (2013.01); *G03G 15/6508* (2013.01); *G03G 15/6582* (2013.01);
(Continued)

(58) Field of Classification Search
CPC ................. G03G 15/6508; B65H 3/44; B65H 2301/1635; B65H 37/04
USPC .................. 271/9.01, 9.05; 399/410, 407, 408
See application file for complete search history.

(56) References Cited

U.S. PATENT DOCUMENTS

| 4,905,054 A * | 2/1990 | Rood ................. G03G 15/6541 270/58.08 |
| 5,913,099 A * | 6/1999 | Kamei ............... G03G 15/6544 270/12 |

(Continued)

FOREIGN PATENT DOCUMENTS

| CN | 1605470 A | 4/2005 |
| CN | 1672943 A | 9/2005 |

(Continued)

OTHER PUBLICATIONS

Japanese Office Action issued on Aug. 21, 2013 by the Japan Patent Office in corresponding Japanese Patent Application No. 2011-134532, and English translation thereof.

(Continued)

*Primary Examiner* — Nguyen Ha
*Assistant Examiner* — Wyn Ha
(74) *Attorney, Agent, or Firm* — Buchanan Ingersoll & Rooney PC

(57) ABSTRACT

An image forming apparatus includes a feeder having a longer side direction orthogonal to a conveyance direction of a recording medium, and feeds a maximum size recording medium with a longer side first, an image forming unit having a maximum sheet feed width corresponding to a longer side length of the maximum size recording medium, and prints a toner image onto the recording medium, and a sub feeder that can feed the maximum size recording medium to the image forming unit independently from the feeder. A post processing apparatus receives a printed recording medium and executes post processing on a side of the recording medium. A feeding source of the maximum size recording medium is selected from the feeder and the sub feeder for executing the post processing on the longer and shorter sides of the maximum size recording medium, respectively.

15 Claims, 11 Drawing Sheets

(51) Int. Cl.
  *B65H 37/04* (2006.01)
  *G03G 21/16* (2006.01)
  *H04N 1/00* (2006.01)

(52) U.S. Cl.
  CPC ......... *H04N1/0062* (2013.01); *H04N 1/00522* (2013.01); *H04N 1/00527* (2013.01); *H04N 1/00631* (2013.01); *H04N 1/00639* (2013.01); *H04N 1/00981* (2013.01); *G03G 2215/00818* (2013.01); *G03G 2215/00827* (2013.01); *H04N 2201/0094* (2013.01)

(56) References Cited

U.S. PATENT DOCUMENTS

| | | | | |
|---|---|---|---|---|
| 6,088,568 | A * | 7/2000 | Ohtani | G03G 15/6544 270/58.07 |
| 6,144,818 | A * | 11/2000 | Ohtani | G03G 15/6544 271/184 |
| 7,177,564 | B2 * | 2/2007 | Nakamura | G03G 15/5025 399/407 |
| 7,245,870 | B2 * | 7/2007 | Ozaki | B41J 11/0025 399/388 |
| 8,262,075 | B2 * | 9/2012 | Shiraishi | B31F 5/027 370/58.08 |
| 2002/0159091 | A1 * | 10/2002 | Sakura | G06F 3/1208 358/1.15 |
| 2004/0114954 | A1 * | 6/2004 | Ohtani | B41J 13/00 399/82 |
| 2004/0228650 | A1 | 11/2004 | Saito | |
| 2005/0078341 | A1 | 4/2005 | Sawada et al. | |
| 2005/0093222 | A1 * | 5/2005 | Ouchi et al. | 271/9.09 |
| 2005/0212896 | A1 | 9/2005 | Nishitani et al. | |
| 2005/0232672 | A1 * | 10/2005 | Nakamura et al. | 399/405 |
| 2006/0210337 | A1 * | 9/2006 | Nagata et al. | 399/407 |
| 2006/0215181 | A1 | 9/2006 | Sugimoto et al. | |
| 2006/0245781 | A1 * | 11/2006 | Douglas | G03G 15/6538 399/82 |
| 2007/0195335 | A1 * | 8/2007 | Tanaka | G03G 15/5012 358/1.1 |
| 2007/0242999 | A1 * | 10/2007 | Tao | B41J 3/60 400/76 |
| 2008/0088875 | A1 | 4/2008 | Taira | |
| 2008/0181699 | A1 * | 7/2008 | Ueda | 399/408 |
| 2010/0231953 | A1 * | 9/2010 | Miyazaki | G06F 17/214 358/1.15 |
| 2010/0239343 | A1 * | 9/2010 | Nukumi | B65H 3/44 399/388 |
| 2011/0222945 | A1 * | 9/2011 | Sato | 399/408 |
| 2011/0227277 | A1 * | 9/2011 | Wada et al. | 271/162 |

FOREIGN PATENT DOCUMENTS

| | | | | |
|---|---|---|---|---|
| CN | 1838059 A | | 9/2006 | |
| CN | 101162373 A | | 4/2008 | |
| JP | 02213869 A | * | 8/1990 | ............ G03G 15/00 |
| JP | 8-295455 A | | 11/1996 | |
| JP | 11-79537 A | | 3/1999 | |
| JP | 2002308520 A | * | 10/2002 | ............ B65H 37/04 |
| JP | 2004-155566 A | | 6/2004 | |
| JP | 2004-334040 | | 11/2004 | |
| JP | 2008-030922 | | 2/2008 | |
| JP | 2008-094562 | | 4/2008 | |

OTHER PUBLICATIONS

Office Action issued on Jun. 4, 2014, by the Chinese Patent Office in corresponding Chinese Patent Application No. 201210183070.6, and an English Translation of the Office Action. (24 pages).

* cited by examiner left-right direction left-right direction
(longer side direction of image reader)
(shorter side direction of feeder)

IMAGE FORMING APPARATUS, IMAGE FORMING SYSTEM, AND POST PROCESSING METHOD

CROSS-REFERENCE TO RELATED APPLICATIONS

The present application claims priority under 35 U.S.C. §119 to Japanese Patent Application No. 2011-134532, filed Jun. 16, 2011. The contents of this application are incorporated herein by reference in their entirety.

BACKGROUND OF THE INVENTION

1. Field of the Invention

The present invention relates to an image forming apparatus, an image forming system, and a post processing method.

2. Discussion of the Background

An image forming system including an image forming apparatus and a post processing apparatus is widely used in offices and the like. The image forming apparatus prints a recording medium based on digital image data acquired by reading a document or through a network. The post processing apparatus receives and executes post processing on the printed recording medium. The post processing herein refers to various types of processing including stapling processing of stapling recording media and punching processing of punching a hole for filing in the recording media.

In recent years, there is a growing demand for use of this kind of image forming system for small business purposes including SOHO (Small Office/Home Office) and private businesses. Additionally, many small businesses with small offices have very limited space, and this has created a demand for minimal space dedicated to the image forming system.

Japanese Unexamined Patent Application Publication No. 2004-155566 discloses an image forming system in which an image reader configured to read an image on a document is disposed above an image forming unit, and a post processing apparatus is embedded in a discharged sheet space between the image reader and the image forming unit so as to acquire space-saving. As in general image forming apparatuses, in the image forming apparatus described in Japanese Unexamined Patent Application Publication No. 2004-155566, the maximum sheet feed width of the image forming unit matches the shorter side length of a maximum size recording medium of a maximum size to be accommodated in a feeder, and the maximum size recording medium is fed and discharged to and from the image forming unit with the shorter side first. The post processing apparatus described in Japanese Unexamined Patent Application Publication No. 2004-155566 simply executes post processing only on a side of the printed recording media orthogonal to a conveyance direction (side along the sheet feed width direction). Accordingly the post processing on the maximum size recording medium is executed only on the shorter side.

In other words, it is not possible to execute the post processing on a longer side of the maximum size recording medium with the configuration described in Japanese Unexamined Patent Application Publication No. 2004-155566. In this case, in order to execute the post processing on the longer side of the maximum size recording medium, it is necessary to replace the above-described post processing apparatus with a post processing apparatus which is capable of executing the post processing on a side of the recording medium along the conveyance direction, or a post processing apparatus which is capable of executing the post processing on both of the sides of the recording medium, the sides being respectively orthogonal and parallel to the conveyance direction, for example. In the former case, two post processing apparatuses are required, which results in cost increase. In the latter case, the structure of the post processing apparatus becomes complicated, thereby increasing the size of the post processing apparatus as well as leading to cost increase. Accordingly, the image forming system is made to be a system against the original intention of acquiring space-saving.

SUMMARY OF THE INVENTION

It is a technical task of the present invention to solve the problems described above.

According to one aspect of the present invention, an image forming system includes an image forming apparatus and a post processing apparatus. The image forming apparatus includes a feeder having a longer side direction orthogonal to a conveyance direction of a recording medium, and configured to feed a maximum size recording medium of a maximum size to be accommodated with a longer side first, an image forming unit having a maximum sheet feed width corresponding to a longer side length of the maximum size recording medium, and configured to print a toner image corresponding to digital image data onto the recording medium, and a sub feeder capable of feeding the maximum size recording medium to the image forming unit independently from the feeder. The post processing apparatus is configured to receive a printed recording medium and execute post processing on any one of a side of the recording medium orthogonal to the conveyance direction and a side of the recording medium parallel to the conveyance direction. Any one of the feeder and the sub feeder is selected as a feeding source of the maximum size recording medium respectively for executing the post processing on the longer side of the maximum size recording medium and executing the post processing on a shorter side of the maximum size recording medium.

According to another aspect of the present invention, an image forming apparatus includes an image forming unit, a feeder, a sheet feed cassette, a manual feeder, and post processing unit. The image forming unit is configured to form an image on a recording medium. The feeder is configured to feed the recording medium to the image forming unit. The sheet feed cassette is removable from the feeder and configured to accommodate the recording medium with a length in a direction along a feeding direction being shorter than a length in a direction orthogonal to the feeding direction. The manual feeder includes a bypass tray configured to feed the recording medium to the image forming unit. The manual feeder has a length in a direction orthogonal to the feeding direction same as a length of the feeder in a direction orthogonal to the feeding direction. The post processing unit is configured to execute post processing on the recording medium on which an image is formed by the image forming unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
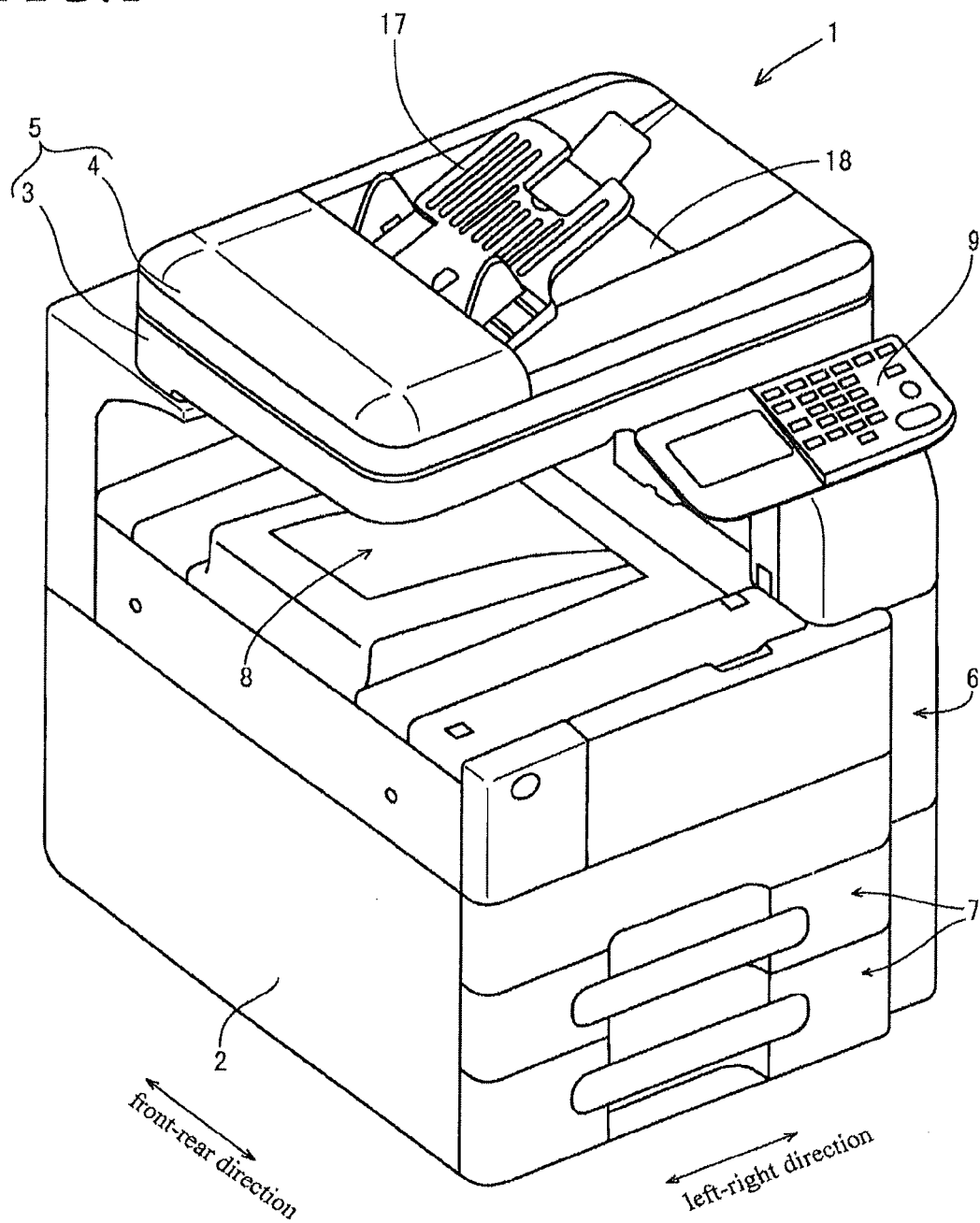
FIG. 1 is a perspective view of an MFP.

An embodiment will now be described with reference to the accompanying drawings, wherein like reference numerals designate corresponding or identical elements throughout the various drawings.

Figure 4:
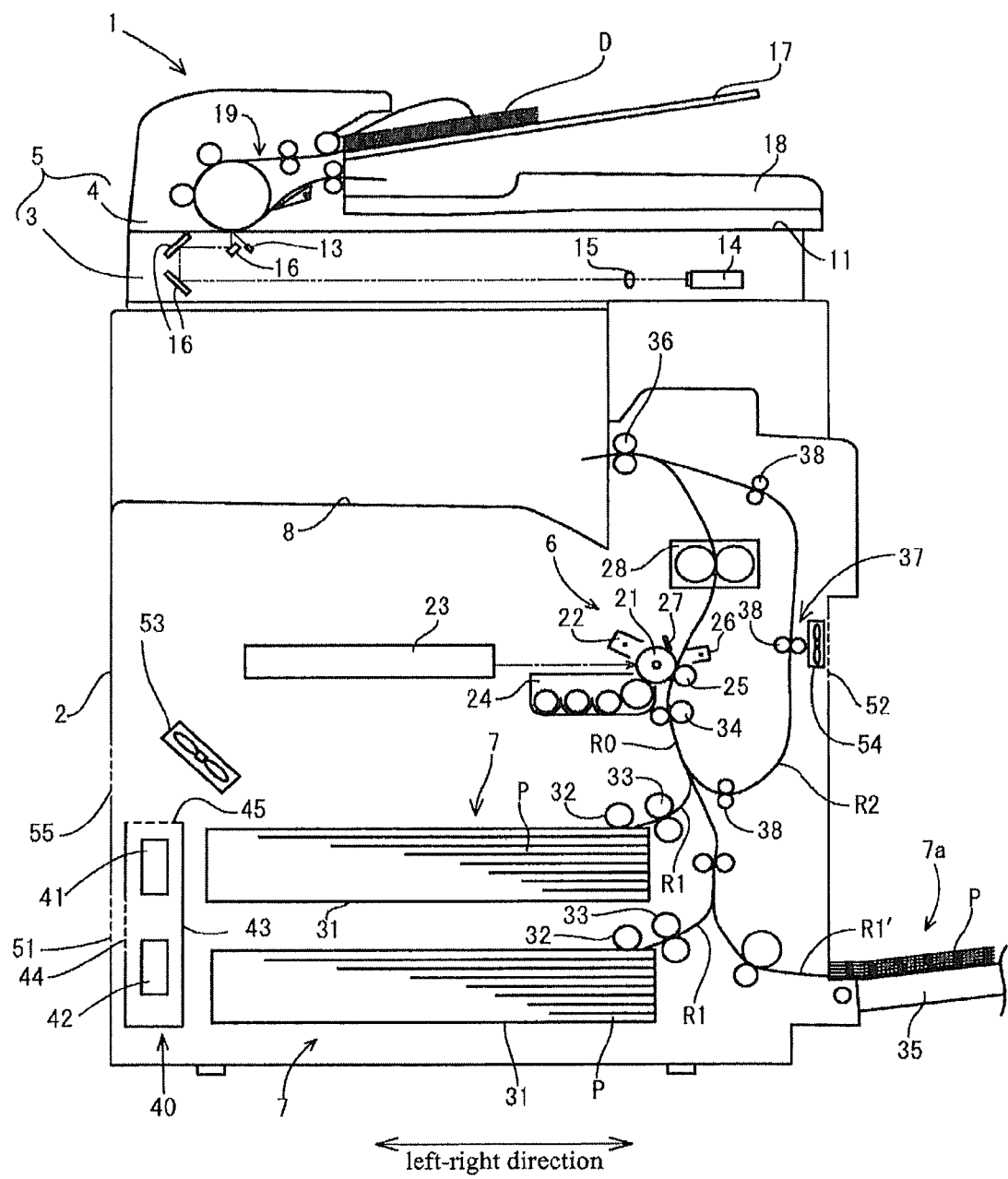
FIG. 4 is a cross-sectional front view of an inner structure of a main body.

In the following description, terms (for example, "left and right" and "upper and lower") indicating specific directions and positions are used where necessary. In this respect, the direction perpendicular to the paper plane of FIG. 4 is defined as front view. The terms are used for the sake of description and will not limit the technical scope of the present invention.

First, a multi-functional printer 1 (hereinafter, referred to as an MFP) as an example of an image forming apparatus will be described by referring to FIG. 1 to FIG. 3. The MFP 1 has multiple functions including a copying function, a scanning function, a printing function, and a facsimile function, and is capable of data communications through networks (communication networks) such as a LAN and a phone line. Specifically, the MFP 1 is capable of outputting digital image data read from a document and subjected to digital conversion to another computer through a network, or inputting digital image data from another computer through a network and printing the digital image data, or transmitting and receiving FAX data.

An image reader 5 is disposed in an upper portion of a main body 2 of the MFP 1, and includes a scanner 3 and an automatic document feeder 4 (hereinafter referred to as an ADF). The image reader 5 synchronizes the scanner 3 with the ADF 4 so as to optically read an image on each document in the ADF 4, thus acquiring digital image data. Specifically, the ADF 4 conveys documents to the scanner 3 one at a time, and the scanner 3 reads the image on each document when each document passes through a predetermined reading position, thus acquiring digital image data.

A feeder 7 that accommodates recording media P is disposed in a lower portion of the main body 2. An image forming unit 6 is disposed between the image reader 5 and the feeder 7 in the main body 2, and prints a toner image corresponding to digital image data onto the recording media P by known electrophotography. Thus, the image reader 5 is disposed above the image forming unit 6 that is disposed above the feeder 7. The feeder 7 supplies the recording media P to the image forming unit 6 one at a time. The image forming unit 6 prints a toner image onto the recording medium P based on digital image data acquired by the image reader 5 or through a network.

In the main body 2, a recessed space between the image reader 5 and the image forming unit 6 serves as a discharged sheet reservoir 8 constituting a discharged sheet space. The discharged sheet reservoir 8 is where the recording medium P having a toner image printed through the image processor 6 is discharged. As will be described in detail later, an inner finisher 70 as an example of a post processing apparatus configured to receive and execute post processing on the printed recording medium P can be disposed (can be added on) in the discharged sheet reservoir 8 (see FIG. 9).

An operation panel 9 as an operation unit, which includes a plurality of keys (buttons), is disposed on a front side (forward side) of the main body 2. A user operates the keys by referring to a display screen and the like on the operation panel 9 when the user executes various kinds of setting of a function selected from the various functions of the MFP 1 and instructs the MFP 1 to execute operations.

The MFP 1 is a so-called A4 compatible printer, and can store, in the feeder 7, the recording medium P of A4 size as the maximum size in a lateral feed position to enter the image forming unit 6 with a longer side first. As shown in FIG. 2 and FIG. 3, the feeder 7 includes removable sheet feed cassettes 31, and recording media P are accommodated in a frame body 31a of each sheet feed cassette 31. The sheet feed cassette 31 is disposed with the length of the frame body 31a in the conveyance direction of the recording medium P being shorter than the length of the frame body 31a in the direction orthogonal to the conveyance direction of the recording medium P. Here, the recording medium P of A4 in landscape has a longer side length L (width) of 297 mm and a shorter side length N (conveyance direction length) of 210 mm.

An inner structure of the main body 2 will be described with reference to FIG. 4 and other figures. The scanner 3 of the image reader 5 in the upper portion of the main body 2 includes a platen 11, a light source device 13, an image sensor 14, an imaging lens 15, and a mirror group 16. The platen 11 includes a platen glass 12 (see FIG. 2) on an upper surface side. The light source device 13 irradiates a document D with light. The image sensor 14 photoelectrically converts reflected light from the document D into an image signal. The imaging lens 15 forms an image on the image sensor 14 from the reflected light. The mirror group 16 sequentially reflects the reflected light from the document D to be incident on the imaging lens 15. The platen 11 incorporates the light source device 13, the image sensor 14, the imaging lens 15, and the mirror group 16.

To read the document D on the platen glass 12, the document D is irradiated with light from the light source device 13 moving in the longer side direction (left-right direction of the main body 2) of the image reader 5 together with the mirror group 16. The reflected light from the document D is sequentially reflected by the mirror group 16 to be incident on the imaging lens 15 that in turn forms an image on the image sensor 14 from the reflected light. The image sensor 14 performs photoelectric conversion for each pixel in accordance with the intensity of the incident light to produce an image signal (RGB signal) corresponding to the image on the document D. The image signal (RGB signal) is output to a control board 42 described later.

The ADF 4 is openably disposed on the upper surface side of the platen 11. The ADF 4 also has a function of putting the document D in close contact with the platen glass 12 by being laid on the document D on the platen glass 12. The ADF 4 includes a document placement tray 17 and a document discharged tray 18. To read the document D placed on the document placement tray 17, the document D is conveyed to a reading position by a document conveyance mechanism 19 including a plurality of rollers and the like. During the conveyance, a portion of the document D at the reading position is irradiated with light from the light source device 13. The image is formed on the image sensor 14 from the reflected light through the mirror group 16 and the imaging lens 15. Then, the image sensor 14 converts the reflected light into the image signal (RGB signal) corresponding to the image on the document D, and outputs the image signal to the control board 42. Then, the document D is discharged onto the document discharged tray 18.

To read the document D of A4 size, which is the maximum size, with the image reader 5, the document D is set to have the longer side aligned with the left-right direction of the main body 2 as viewed from the front. In other words, the document D is set to have the longer side orthogonal to the sheet feed width direction of the image forming unit 6 (front-rear direction of the main body 2). The document D on the document placement tray 17 in the ADF 4 is longitudinally fed in the left-right direction of the main body 2 with the shorter side first. Thus, the longer and shorter sides of the image reader 5 are respectively aligned with the left-right and front-rear directions of the main body 2.

As shown in FIG. 4, the image forming unit 6 transfers a toner image formed on a photoreceptor drum 21 as an image carrier onto a recording medium P through a known electrophotography, and conveys the recording medium P after the transfer to a fixing unit 28 to be heated and pressed so that the toner image is fixed onto the recording medium P. Around the photoreceptor drum 21, a charger 22, an exposing unit 23, a developer 24, a transfer roller 25, a separator 26, and a cleaner 27 are arranged in this order in the rotational direction of the photoreceptor drum 21 (in the counterclockwise direction of FIG. 4).

The charger 22 uniformly charges a surface of the photoreceptor drum 21. The exposing unit 23 forms an electrostatic latent image on the surface of the photoreceptor drum 21. The developer 24 develops the electrostatic latent image on the photoreceptor drum 21 into a toner image (visible image). The transfer roller 25 transfers the toner image on the photoreceptor drum 21 onto the recording medium P. The photoreceptor drum 21 and the transfer roller 25 define, at the position of their contact, a transfer position. The separator 26 separates the recording medium P from the photoreceptor drum 21. The cleaner 27 removes un-transferred toner remaining on the photoreceptor drum 21. The maximum sheet feed widths (the maximum value of the width direction length orthogonal to the conveyance direction of the recording medium P) of the photoreceptor drum 21, the transfer roller 25, and the like are slightly larger than the longer side direction length L (=297 mm) of the recording medium P of A4 in landscape. Thus, the toner image can be transferred onto the recording medium P of A4 in landscape.

The fixing unit 28 includes a fixing roller and a pressure roller. The fixing roller incorporates a heat source such as a halogen heater. The pressure roller is opposite the fixing roller. The fixing roller and the pressure roller define, at the portion of their contact, a fixing position. The control board 42 controls power to the fixing heater to keep the fixing heater at a temperature necessary for the fixing. The maximum sheet feed width of the fixing unit 28 is also slightly larger than the longer side direction length L (=297 mm) of the recording medium P of A4 in landscape. Thus, the recording medium P of A4 in landscape can be heated and pressed. The maximum sheet feed widths of the photoreceptor drum 21, the transfer roller 25, and the like, as well as the fixing unit 28 indicate that, in this embodiment, the maximum sheet feed width of the image forming unit 6 is set to allow the recording medium P of A4 in landscape to be printed.

As shown in FIG. 4, the feeder 7 includes the sheet feed cassettes 31, feeding rollers 32, pairs of separating rollers 33, and pairs of registration rollers 34. The sheet feed cassettes 31 are vertically stacked and each accommodates recording media P. The feeding rollers 32 each feeds the recording media P in corresponding one of the sheets feed cassettes 31 one at a time from the top. Each pair of separating rollers 33 separates the picked part of recording media P into individual sheets. The pairs of registration rollers 34 determine the timing at which to feed the fed recording media P to the transfer position. The recording media P in each of the sheet feed cassettes 31 are fed to a main conveyance path R0 through a sheet feed path R1 one at a time from the top by the driving rotation of a corresponding set of the feed roller 32 and the pair of separation rollers 33. The main conveyance path R0 serves as a main path through which the recording medium P is subjected to the image forming (printing) steps. The sheet feed path R1 is provided to each of the sheet feed cassettes 31. The sheet feed paths R1 each join the main conveyance path R0 on the upstream side of the pair of registration rollers 34 in the conveyance direction.

Figure 2:
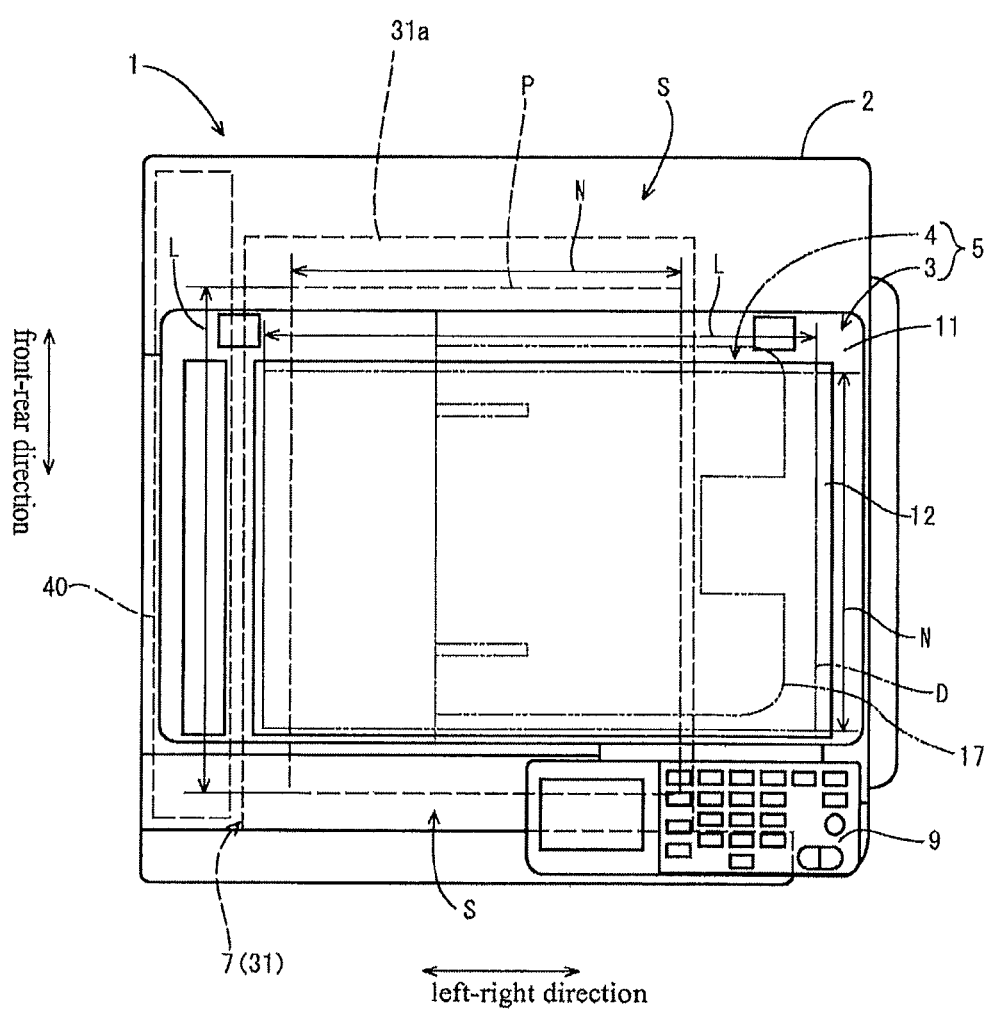
FIG. 2 is a plan view of the MFP without an ADF.

As shown in FIG. 2, the longer side direction of the sheet feed cassette 31 is aligned with the front-rear direction of the main body 2. Thus, the longer side direction of the recording medium P of A4 size accommodated in the sheet feed cassette 31 is aligned with the front-rear direction of the main body 2. Accordingly, the recording medium P of A4 size is laterally fed to the image forming unit 6 with the longer side first.

As shown in FIG. 2, the longer side direction of the sheet feed cassette 31 is orthogonal to the longer side direction of the image reader 5. This also indicates that, in the main body 2, the front-rear length of the upper portion constituting the image reader 5 is shorter than the front-rear length of the lower portion incorporating the sheet feed cassettes 31 and the like. Thus, in the plan view, the lower portion (main body 2) partially overlaps with the upper portion (image reader 5) and sticks out at least from the closer longer side of the upper portion (image reader 5). In this embodiment, due to the appearance of the lower portion (main body 2), open spaces S are respectively formed in front of and behind the upper portion (image reader 5) in the plan view.

Figure 3:
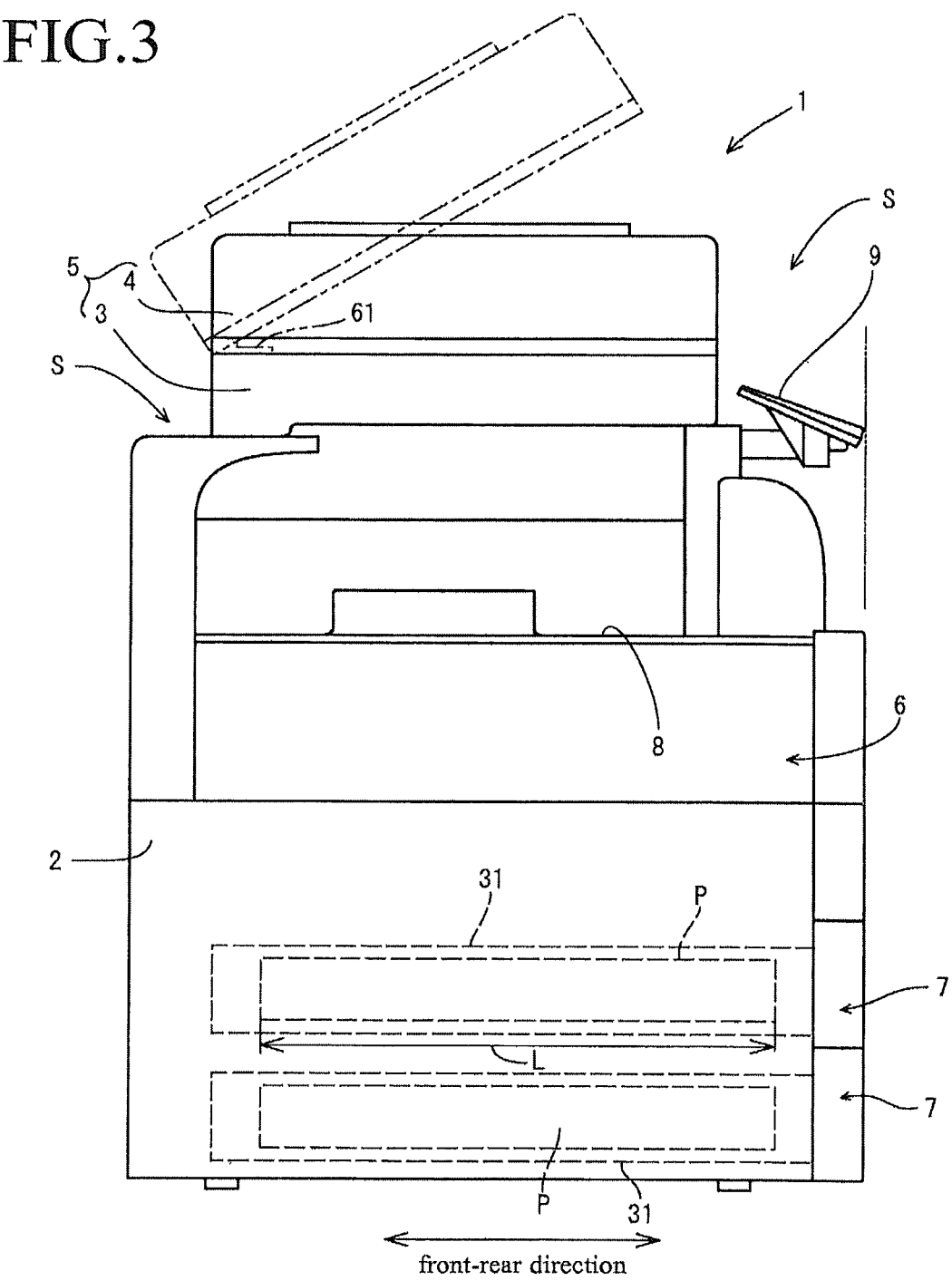
FIG. 3 is a right side view of the MFP.

The operation panel 9 as an operation unit is disposed in the front open space S adjacent to the image reader 5 without sticking out from the outer surface of the one shorter side portion of the feeder 7 along the left-right direction of the main body 2 (forward surface portion in this embodiment) (see FIG. 3). The one shorter side portion of the feeder 7 corresponds to the one shorter side of the recording medium P of A4 size. The operation panel 9 has the front end side located more on the inner side than the forward surface of the main body 2 (feeder 7) and thus is entirely embedded in the front open space S.

As shown in FIG. 4, a pair of discharging rollers 36 are disposed above the image forming unit 6 that is disposed above the feeder 7. The recording medium P is conveyed vertically upward in the main conveyance path R0. Here, the image forming unit 6 is disposed above the one longer side of the sheet feed cassette 31 in the front-rear direction of the main body 2. The one longer side of the sheet feed cassette 31 corresponds to the one longer side of the recording medium P of A4 size. Thus, the image forming unit 6 of this embodiment is offset to the right side in the main body 2. The main conveyance path R0, the pair of discharging rollers 36, and a circulation conveyance unit 37 are also offset to the right side in the main body 2.

As shown in FIG. 4, a manual feeder 7a used as a sub-feeder includes a retractable bypass tray 35. Specifically, the bypass tray 35 through which the recording medium P of a predetermined size can be fed from outside is provided on the one side (right side in this embodiment) of the main body 2 in the left-right direction. The bypass tray 35 is provided in addition to the regular feeder 7 in the main body 2, and is pivotably mounted to be opened and closed to the one side of the main body 2 in the left-right direction. The recording media P on the bypass tray 35 is fed to the main conveyance path R0 through a manual sheet feed path R1' one at a time from the top by the driving rotation of a pickup roller and the like. The maximum sheet feed width of the image forming unit 6 in the MFP 1 corresponds to the longer side length L of the recording medium P of A4 in landscape. Thus, the recording medium P of A3 size can be longitudinally fed through the bypass tray 35 to be printed. The manual feeder 7a with a portion on which the recording medium P is placed defined as "placement portion" is formed to satisfy the following condition. Specifically, the length of the placement portion in the direction orthogonal to the conveyance direction of the recording medium P (i.e., feed direction) is the same with the length of the frame body 31a of the sheet feed cassette 31 in the direction orthogonal to the conveyance direction of the recording medium P.

The pair of discharging rollers 36 that discharge the printed recording medium P is disposed more on the downstream side than the fixing unit 28 in the main conveyance path R0. The printed recording medium P is discharged onto the discharged sheet reservoir 8 by driving rotation of the pair of discharging rollers 36.

The circulation conveyance unit 37 for reversing the recording medium P having the one side printed for duplex printing is disposed in the main body 2 of this embodiment. The circulation conveyance unit 37 includes a pair of reversing rollers that reverse the recording medium P having the one side printed, and pairs of duplex conveyance rollers 38. In the circulation conveyance unit 37, the recording medium P having the one side printed is reversed and is again conveyed to the pair of registration rollers 34 through a circulation conveyance path R2. Here, the pair of discharging rollers 36 is rotatable back and forth, and thus also serves as the pair of reversing rollers. The back and forth rotation of the pair of discharging rollers 36 allows the recording medium P to be discharged from the MFP 1 and to be switched back (backwardly fed) to return into the MFP 1. The upstream side of the circulation conveyance path R2 is branched off from the main conveyance path R0 at a portion between the fixing unit 28 and the pair of discharging rollers 36. The downstream side of the circulation conveyance path R2 joins the main conveyance path R0 at a portion more on the upstream side than the pair of registration rollers 34.

As shown in FIG. 4, in the main body 2, the image forming unit 6 and an electrical component unit 40 are respectively disposed on both sides of the feeder 7 in shorter side direction. The electrical component unit 40 on the opposite side of the image forming unit 6 across the feeder 7 includes a power source board 41 that controls power to the units (e.g., the image reader 5, the image forming unit 6, and the feeder 7) of the main body 2 and the control board 42 in charge of overall control of operations of the units. The power source board 41 and the control board 42 are surrounded by a shield casing 43 formed by shaping a metal plate into a box. With the shield casing 43 surrounding the boards 41 and 42, noise emitted from the boards 41 and 42 is prevented from spreading, and the grounding of the boards 41 and 42, and the like is improved.

As described above, the image forming unit 6 of this embodiment is above the right longer side of the uppermost sheet feed cassette 31. The electrical component unit 40 is located on the left side of the left longer side portion of the sheet feed cassette 31. Here, the shield casing 43 has a shape of a box that is long in the upper-lower and front-rear directions and short in the left-right direction. The shield casing 43 is vertically installed on the left side of the left longer side of the sheet feed cassette 31. The power source board 41 and the control board 42 are vertically installed in the shield casing 43.

Figure 6:
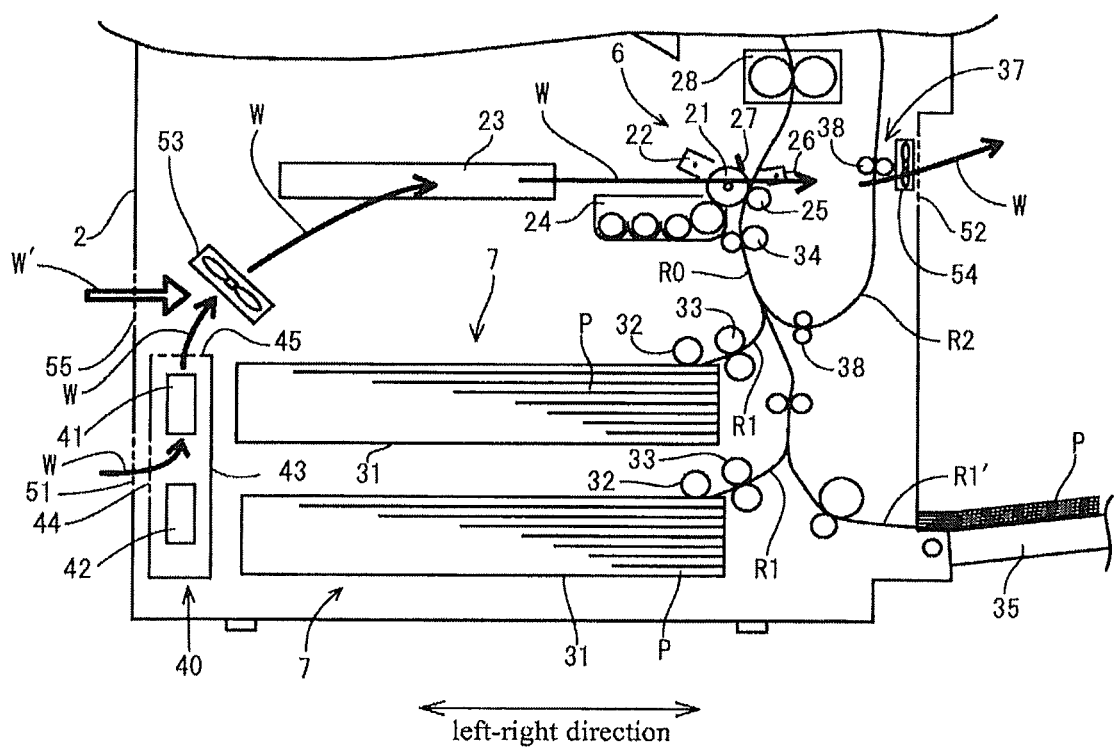
FIG. 6 is a cross-sectional enlarged front view of the inner structure of the main body.

As shown in FIG. 4 and FIG. 6, a left side plate of the main body 2 includes an intake hole 51 facing the electrical component unit 40, while a right side plate of the main body 2 includes an exhaust hole 52 facing the transfer roller 25 and the duplex conveyance roller 38 at an intermediate portion of the circulation conveyance path R2. A left side plate of the shield casing 43 constituting the electrical component unit 40 includes a casing side intake hole 44 for taking in outer air entered through the intake hole 51, while an upper surface plate of the shield casing 43 includes a casing side exhaust hole 45 for exhausting the air in the shield casing 43. A cooling fan 53 is disposed above the casing side exhaust hole 45 of the shield casing 43. In this embodiment, an exhaust fan 54 is disposed facing the exhaust hole 52 in the main body 2.

Driving rotation of the cooling fan 53 and the exhaust fan 54 makes the air in the shield casing 43 flow upward, and the air in the main body 2 flow from left to right to lower the inner pressure. Thus, the pressure difference is produced between the inside and the outside of the shield casing 43 as well as between the inside and the outside of the main body 2. Accordingly, the outer air is taken in through the intake hole 51. The air that has been taken in through the intake hole 51 and passed through the casing side intake hole 44 flows in the shield casing 43 to take heat from the power source board 41 and the control board 42, and then is guided to the exposing unit 23 through the casing side exhaust hole 45 on the upper surface plate and the cooling fan 53. Then, the air guided to the exposing unit 23 (air warmed while flowing in the shield casing 43) cools part of the image forming unit 6 other than the exposing unit 23 (the photoreceptor drum 21, the developer 24, the transfer roller 25, and the like) and then is exhausted through the exhaust hole 52 (see the direction indicated by an arrow W in FIG. 6).

In other words, as indicated by the arrow W in FIG. 6, the air taken in through the intake hole 51 flows to pass through the electrical component unit 40, the exposing unit 23, and the part of the image forming unit 6 other than the exposing unit 23, and then is exhausted through the exhaust hole 52. Thus, the path extending from the intake hole 51 to the exhaust hole 52 through the electrical component unit 40, the exposing unit 23, and the part of the image forming unit 6 other than the exposing unit 23 is an air flow path W (path of air). Accordingly, the cooling fan 53 is located between the electrical component unit 40 and the image forming unit 6 (specifically, the exposing unit 23) in the air flow path W. The exhaust hole 52 of this embodiment is opened in the right side plate of the main body 2 to be adjacent to a portion between the transfer roller 25 and the fixing unit 28. Thus, the air passing through a portion around the image forming unit 6 also takes heat from a portion around the fixing unit 28 and then is exhausted through the exhaust hole 52 (the air flowing through the air flow path W also takes heat from the portion around the fixing unit 28).

In this embodiment, the left side plate of the main body 2 includes an air intake hole 55 at a portion facing the cooling fan 53 in addition to the intake hole 51. The outer air taken in through the air intake hole 55 is guided to the cooling fan 53 without passing through the electrical component unit 40, and joins the air flow path W after the exposing unit 23. Thus, the air taken in through the air intake hole 55 has a lower temperature than the air that has passed through the electrical component unit 40, thereby exhibiting high cooling effect. A path that reaches the cooling fan 53 from the air intake hole 55 without passing through the electrical component unit 40 is an air introduction path W' different from the air from path W. The air intake hole 55, the cooling fan 53, the image forming unit 6, the exhaust fan 54, and the exhaust hole 52 are horizontally arranged approximately linearly. Accordingly, the air that does not pass through the electrical component unit 40 and thus has a low temperature flows very smoothly, and thus can exhibit high air cooling effect on the image forming unit 6.

The printing by the MFP 1 will be briefly described. The MFP 1 starts printing upon receiving a start signal, the image signal, and the like. In one-surface printing, the recording medium P fed from the feeder 7 (the sheet feed cassette 31 or the bypass tray 35) is conveyed to the image forming unit 6 through the main conveyance path R0. In the image forming unit 6, the recording medium P is conveyed to the transfer position by the pair of registration rollers 34 at the timing when the forwarding end of the toner image on the photoreceptor drum 21 reaches the transfer position, and the toner image on the photoreceptor drum 21 is transferred onto the recording medium P. After the transfer, the un-transferred toner remaining on the photoreceptor drum 21 is scraped off and removed by the cleaner 27. The recording medium P loaded with an unfixed toner image on the one surface is heated and pressed through the fixing position of the fixing unit 28, and thus the unfixed toner image is fixed. The recording medium P after having the toner image fixed (after having the one surface printed) is discharged onto the discharged sheet reservoir 8. In duplex printing, the recording medium P after having the one surface printed is conveyed to the circulation conveyance path R2 for the duplex printing to be reversed and returned to the main conveyance path R0. Thus, a toner image is transferred and fixed onto the other surface of the recording medium P.

Figure 5:
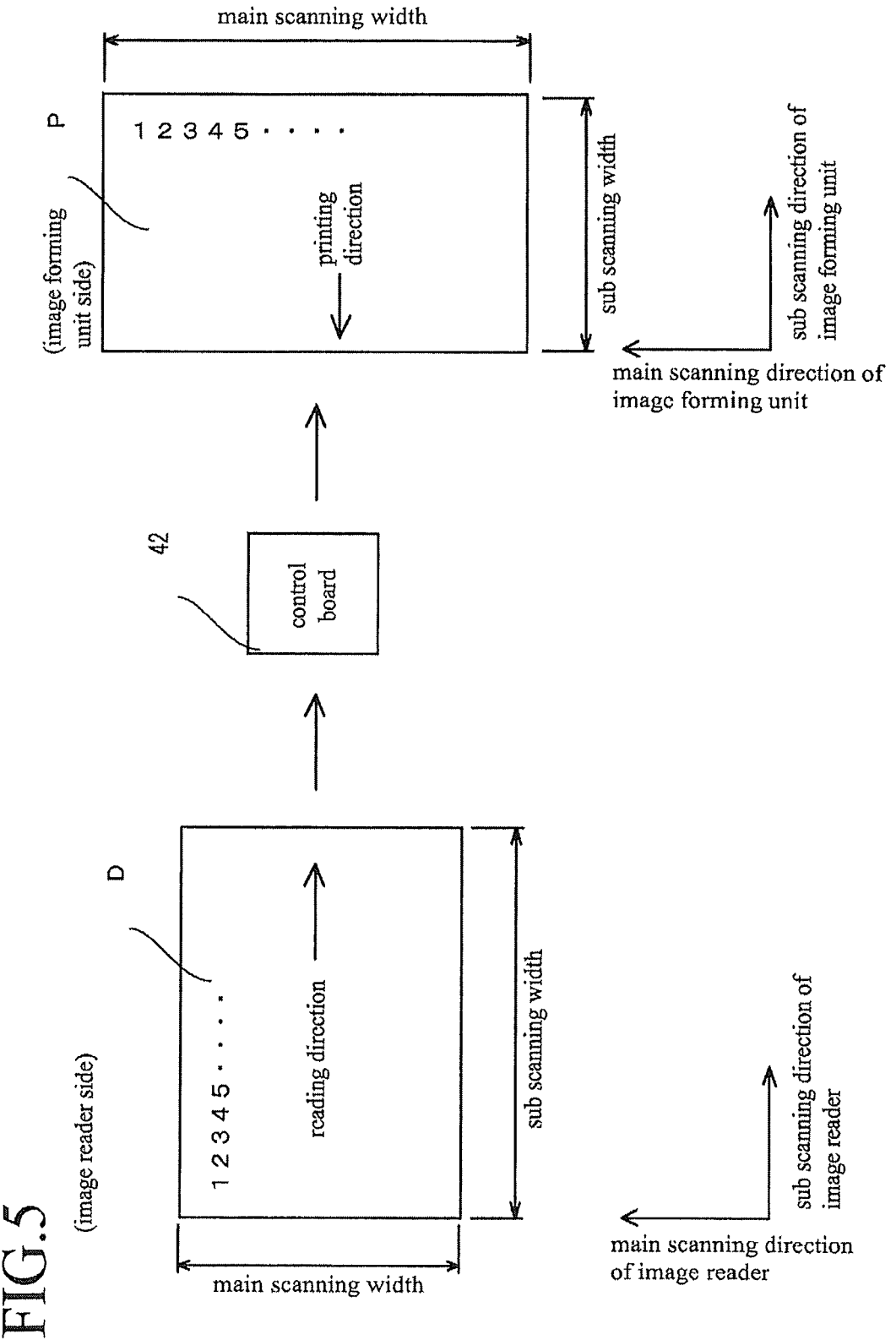
FIG. 5 is a schematic diagram illustrating an example of copying by the MFP.

Next, an example of copying by the MFP 1 will be described with reference to FIG. 5 and other figures. As described above, the light source device 13 and the mirror group 16 move in the longer side direction of the image reader 5 (left-right direction of the main body 2) to read the image on the document D placed on the platen glass 12 of the platen 11. In other words, the sub scanning direction of the image reader 5 matches the longer side direction of the image reader 5, while the main scanning direction of the image reader 5 matches the shorter side direction of the image reader 5.

The image reader 5 of this embodiment allows the document D of A4 size as the maximum size, to be placed on the platen glass 12 of the platen 11 with the longer side direction of the document D aligned with the longer side direction of the image reader 5 (left-right direction of the main body 2). Here, the image signal read by the image reader 5 indicates that the main scanning direction width is 210 mm and the sub scanning direction width is 297 mm. The longer side direction of the document D of A4 size placed on the platen glass 12 is orthogonal to the longer side direction of each sheet feed cassette 31 (accommodated recording medium P) and the sheet feed width direction of the image forming unit 6. In other words, the document D of A4 size on the platen glass 12 is turned by 90° from the recording medium P in each sheet feed cassette 31. The main scanning direction (corresponding to the maximum width) of the image forming unit 6 is set to 297 mm in accordance with the longer side length L of the recording medium P of A4 in landscape.

Thus, in this embodiment, when copying the document D of A4 size, which is the maximum size, placed on the platen glass 12 of the platen 11 at the same magnification, the control board 42 replaces the sub scanning direction of the digital image data obtained by reading the document D with the main scanning direction of the image forming unit 6, and replaces the main scanning direction of the digital image data with the sub scanning direction of the image forming unit 6. The image forming unit 6 performs printing based on the replaced digital image data. In other words, the digital image data obtained by reading the document D is turned by 90° and the image forming unit 6 prints the toner image corresponding to the turned digital image data onto the recording medium P of A4 in landscape (see FIG. 5). It is matter of course that the setting on the printing magnification (same magnification, enlarged, reduced, and the like) is received through the operation panel 9 or a network.

Figure 7:
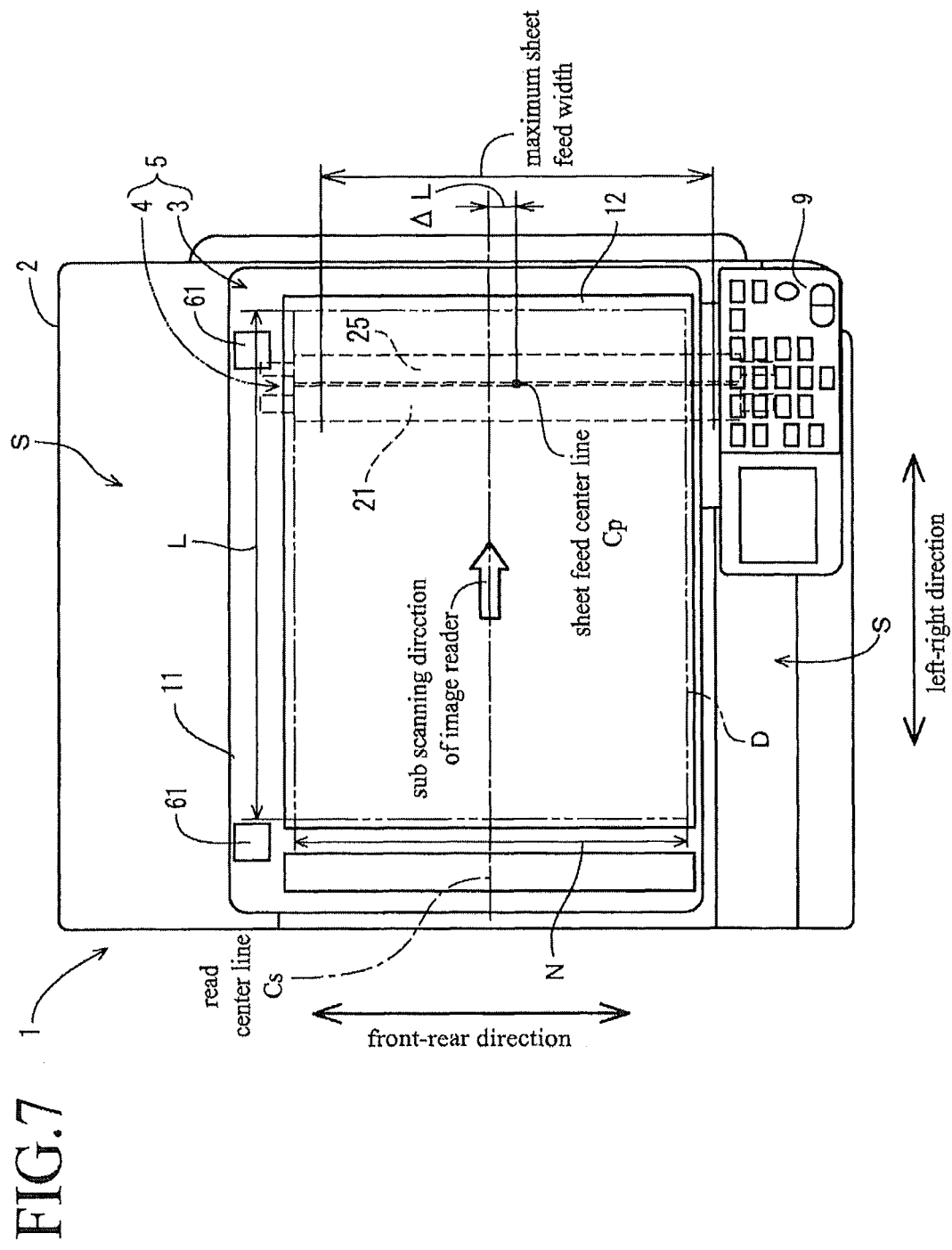
FIG. 7 is a plan diagram illustrating a relationship between a read center line and a sheet feed center line.

As described above, the image reader 5 including the scanner 3 and the ADF 4 is disposed in the upper portion of the main body 2 incorporating the feeder 7 and the image forming unit 6. The ADF 4 is openably disposed on the upper surface side of the platen 11 constituting the scanner 3 via a pair of hinges 61 (see FIG. 2, FIG. 3, and FIG. 7). As shown in FIG. 2, FIG. 3, and FIG. 7, the hinges 61 are located on the farther longer side of the platen 11. Thus, opening and closing moment of the ADF 4 of this embodiment is much smaller than that of an ADF that opens and closes via a hinge provided on a farther shorter side of the platen (see Japanese Unexamined Patent Application Publication No. 2002-148872 and Japanese Unexamined Patent Application Publication No. 2006-323224, for example). Thus, the ADF 4 can be easily opened and closed. It is matter of course that, the opening and closing moment can be also reduced by using a document holder (having no automatic document feeding function) instead of the ADF 4. The document holder puts the document D in close contact with the platen glass 12 by being laid on the document D on the platen glass 12.

Figure 8:
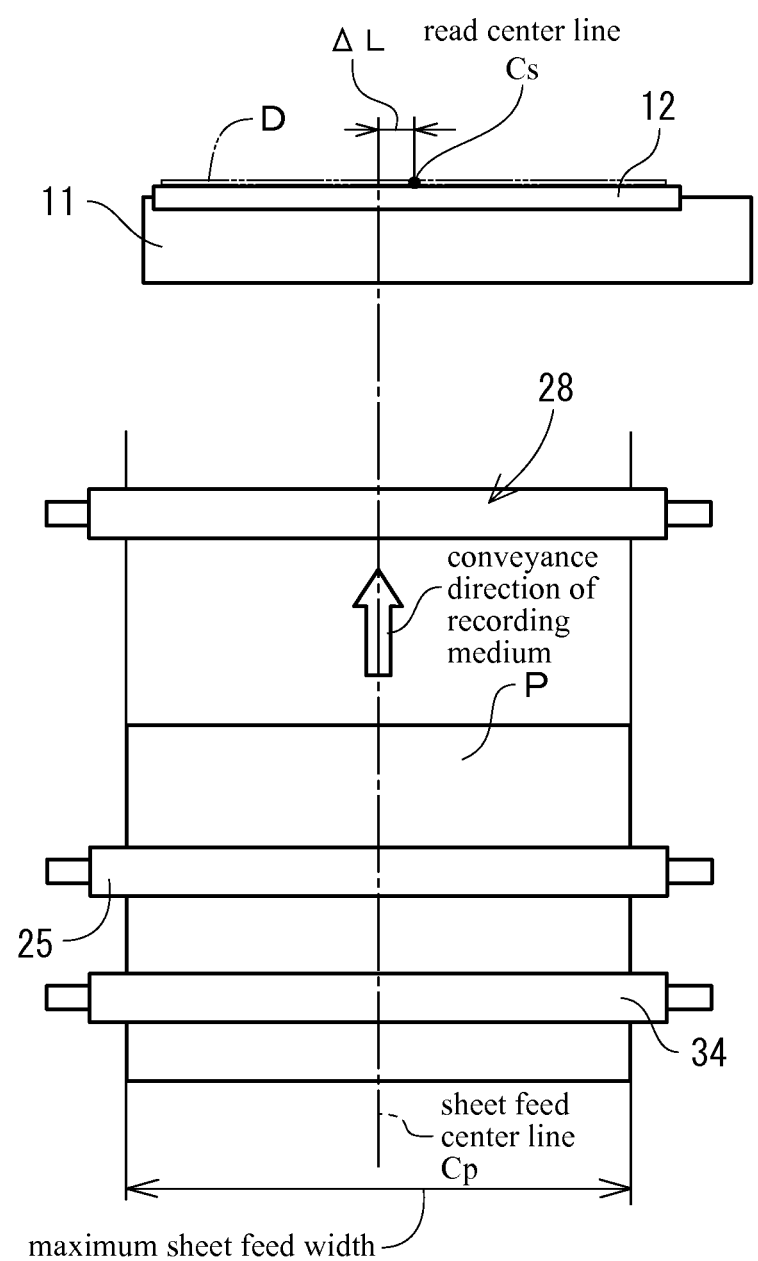
FIG. 8 is a schematic side diagram illustrating a relationship between the read center line and the sheet feed center line.

As shown in FIG. 7 and FIG. 8, a read center line Cs of the image reader 5 extends in the sub-scanning direction (shorter side direction) and passes through a bisecting position (center) of the main scanning width. In other words, the read center line Cs passes through the center of the main scanning width and is orthogonal to the main scanning direction (longer side direction). A sheet feed center line Cp of the image forming unit 6 is a straight line passing through the center of the maximum sheet feed width and is orthogonal to the sheet feed width direction. In this embodiment, the image reader 5 and the main body 2 (image forming unit 6) are so disposed that the read center line Cs of the image reader 5 is offset to the rear side (farther side) from the sheet feed center line Cp by an appropriate distance ΔL. Thus, the front open space S adjacent to the image reader 5 can be easily secured, and the printed recording medium P can be discharged closely to the front open space S in the discharged sheet reservoir 8 between the image reader 5 and the main body 2. Thus, the printed recording medium P on the discharged sheet reservoir 8 can be seen and taken out more easily.

In the above-described structure, the MFP 1 includes the feeder 7 and the image forming unit 6. The feeder 7 has the longer side direction orthogonal to the conveyance direction of the recording medium P so that the maximum size recording medium P can be fed with the longer side first. The image forming unit 6 has the maximum sheet feed width corresponding to the longer side length L of the maximum size recording medium P and prints the toner image corresponding to the digital image data onto the recording medium P. Thus, the recording medium P of the maximum size is conveyed along the shorter side direction to be printed.

Thus, if the process speed of the MFP 1 is the same, driving time of the image forming unit 6 and the like can be largely shortened compared with a conventional case where the recording medium P is conveyed along the longer side direction. Accordingly, energy consumed by using electricity as well as noise can be reduced, and thus, the environmental load can be reduced. Moreover, if the process speed is the same, the number of printed sheets per unit time can be increased because the time for conveyance for the shorter side length N is the only time required for printing. Furthermore, if the consumed power is the same, the process speed can be increased and the printing performance of the MFP 1 can be improved compared with the conventional case.

In summary, the MFP 1 of this embodiment can reduce the environmental load throughout the life cycle compared with the conventional case with the same process speed, and can improve printing performance compared with the conventional case with the same power consumption.

Particularly, the MFP 1 of this embodiment is a so-called A4 compatible printer, and thus an image forming unit same as that used in a conventional A3 compatible printer for example can be directly used. Accordingly, the image forming unit 6 needs not be newly designed for the A4 compatible printer. Thus, the development period and the development cost can be shortened and reduced. Moreover, the common parts can be shared among a plurality of types of apparatuses. This contributes to the reduction of manufacturing cost.

In this embodiment, the MFP 1 further includes the image reader 5 having the shorter side aligned with the sheet feed width direction of the image forming unit 6 and the longer side direction of the feeder 7, so that the longer side direction of the maximum size document D on the platen 11 is orthogonal to the sheet width direction of the image forming unit 6 and the longer side direction of the feeder 7. Thus, the open spaces S can be respectively provided in front of and behind the image reader 5 in the shorter side direction due to the longer side direction of the feeder 7. The open space S can be utilized to dispose the operation panel 9 for input operation and the like within the occupation area of the MFP 1 (without sticking out) for example. This can provide a compact and thus favorably viewed design.

In this embodiment, the longer side direction of the image reader 5 matches the sub scanning direction. To copy the document D of the maximum size on the platen 11 at the same magnification, the image forming unit 6 performs printing by replacing the sub scanning direction of the digital image data obtained by reading the document D with the main scanning direction of the image forming unit 6, and replacing the main scanning direction of the digital image data with the sub scanning direction of the image forming unit 6. Thus, unlike in the conventional case where the recording medium P is conveyed along the longer side direction, the time required for conveyance for the shorter side length N is the only time required for printing after the document D is read. Thus, the printing performance for copying the document D of the maximum size at the same magnification can be improved.

Furthermore, in this embodiment, in the plan view, the main body 2 partially overlaps with the image reader 5, and sticks out at least from the closer longer side of the image reader 5. Moreover, the sheet discharged space (discharged sheet reservoir 8) to which the printed recording medium P is discharged is formed between the main body 2 and the image reader 5. Thus, the image reader 5 needs not to cover a large area of the discharged sheet space, and whether the printed recording medium P is in the discharged sheet space can be easily confirmed visually from the sticking out side of the main body 2. Therefore, the risk of forgetting to take out and leaving the printed recording medium in the discharged sheet space can be reduced.

In this embodiment, the image forming unit 6 and the electrical component unit 40 are respectively disposed on both sides of the feeder 7 in the shorter side direction. Thus, a vacant space formed on the opposite side of the image forming unit 6 across the feeder 7 can be utilized to dispose the electrical component unit 40 because the recording medium P is conveyed with the longer side first. Thus, a wasteful space in the MFP 1 can be reduced, and the MFP 1 as a whole can be downsized. Moreover, the feeder 7 disposed between the image forming unit 6 and the electrical component unit 40 can prevent the heat generated in the electrical component unit 40 from adversely affecting the image forming unit 6. Furthermore, the electrical component unit 40 is disposed apart from the image forming unit 6 and thus does not hinder operations such as jam clearance.

The electrical component unit 40 of the first embodiment is vertically installed on the outer side of the left longer side of the vertically stacked sheet cassettes 13 in the main body 2. Thus, the heat generated in the electrical component unit 40 can be released upward by natural convection. Moreover, the intake hole 51 is formed on the left side plate closer to the electrical component, and the exhaust hole 52 is formed on the right side plate closer to the image forming unit 6 in the main body 2. The main body 2 incorporates the air flow path W extending from the intake hole 51 to the exhaust hole 52 through the electrical component unit 40 and the image forming unit 6, and the cooling fan 53 disposed between the electrical component unit 40 and the image forming unit 6 in the air path W. Thus, the heat released upward from the electrical component unit 40 by natural convection can be smoothly conveyed by air flowing through the air flow path W. Accordingly, heat radiation efficiency can be improved.

Moreover, the left side plate closer to the electrical component unit 40 in the main body 2 includes the air intake hole 55 in addition to the intake hole 51. The main body 2 includes the air introduction path W' extending from the air intake hole 55 to the cooling fan 53 without passing through the electrical component unit 40 in addition to the air flow path W. Thus, the air that does not pass through the electrical component unit 40 and thus having a low temperature can be more guided to the image forming unit 6, and thus, cooling effect on the image forming unit 6 can be improved.

Figure 9:
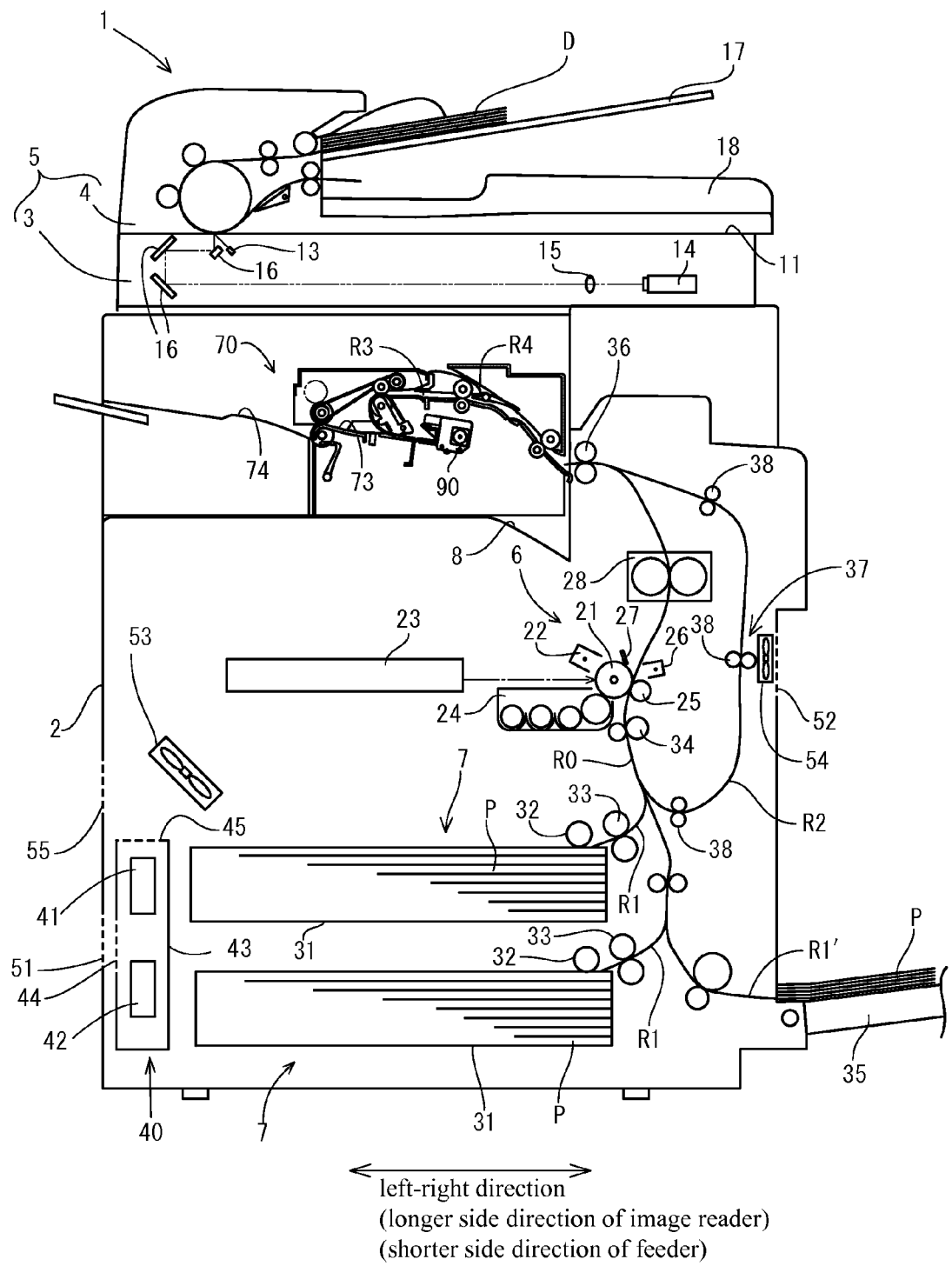
FIG. 9 is a cross-sectional front view of the MFP with an inner finisher.
Figure 10:
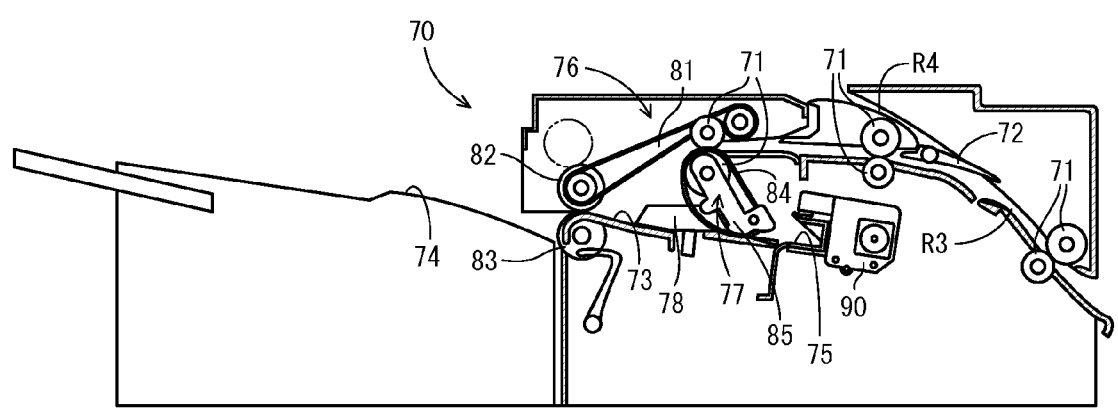
FIG. 10 is a cross-sectional enlarged front view of the inner finisher.
Figure 11A:
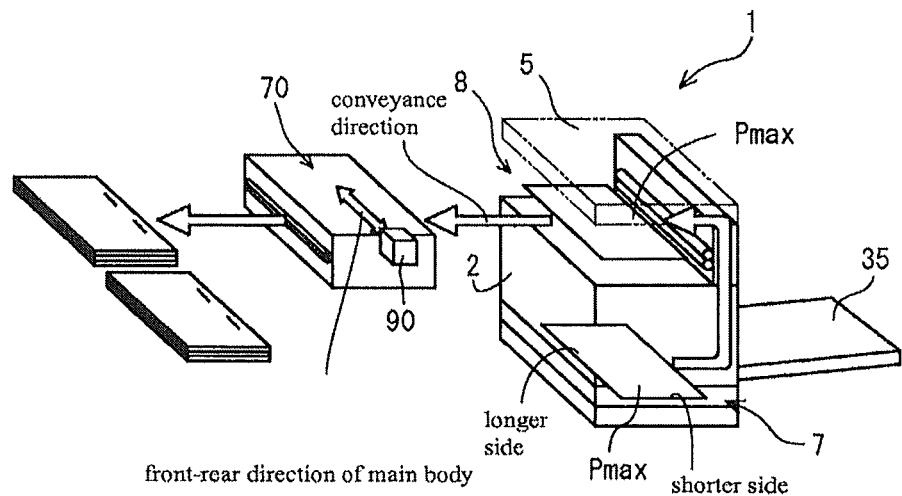
FIG. 11A is a diagram illustrating a case where post processing is executed on a longer side of a maximum size recording medium.
Figure 11B:
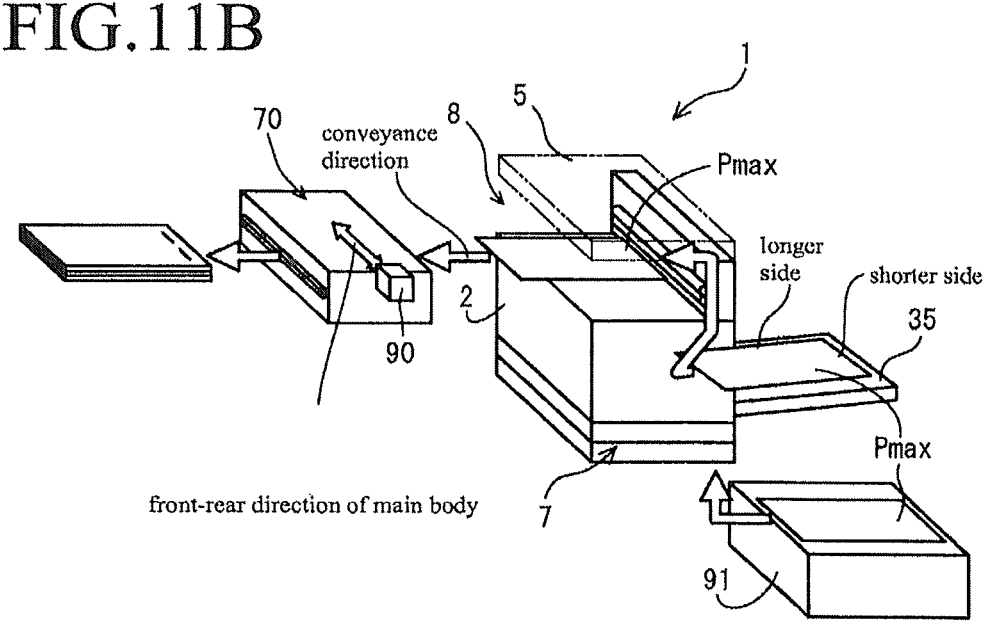
FIG. 11B is a diagram illustrating a case where the post processing is executed on a shorter side of the maximum size recording medium.

Next, the inner finisher 70 as an example of a post processing apparatus will be described in detail with reference to FIG. 9 to FIG. 11. As described above, the inner finisher 70 that receives and executes post processing on the printed recording medium P can be mounted (added on) in the discharged sheet reservoir 8 between the image reader 5 and the image forming unit 6. The inner finisher 70 can execute at least one of stapling processing of stapling the recording media P together and punching processing of punching a hole in the recording media P as post-processing after printing. In this embodiment, the inner finisher 70 that executes the stapling processing is mounted in the discharged sheet reservoir 8 (see FIG. 9 and FIG. 11).

The inner finisher 70 includes a post processing path R3 that continues to the main conveyance path R0 at a portion more on the downstream side than the pair of discharging rollers 36. Pairs of conveyance rollers 71 are disposed in the post processing path R3. A discharged path R4 extending toward an overflow stacker (not illustrated) is branched off from the upstream side of the post processing path R3. The overflow stacker receives an overflow recording medium P, the recording medium P subjected to the interruption printing, and the like that require no post processing. A path switching flapper 72 is disposed at the branching portion between the post processing path R3 and the discharged path R4. The path switching flapper 72 is drivingly switched between a state of closing the entrance to the discharged path R4 to guide the recording medium P to the post processing path R3 and a state of closing an intermediate portion of the post processing path R3 to guide the recording medium P to the discharged path R4.

One descending step, which constitutes a processing tray 73, is disposed on the downstream side of the post processing path R3. A stack tray 74 is disposed more on the downstream side than the processing tray 73. The processing tray 73 and the stack tray 74 are serially arranged along the conveyance path of the recording medium P so that the recording medium P sent from the post processing path R3 can be placed over both trays. In this case, the conveyance forwarding and rear ends of the recording medium P are respectively placed on the stack tray 74 and the processing tray 73.

A restriction stopper 75 having a substantially U-shaped cross section is disposed on the opposite side of the stack tray 74 across the processing tray 73 in the inner finisher 70. Conveyance forwarding ends the recording media P are abutted to and aligned by the restriction stopper 75. A returning mechanism 76, a cooperative returning mechanism 77, and lateral regulation members 78 are disposed above the processing tray 73. The returning mechanism 76 conveys the recording medium P past the post processing path R3 to the regulation stopper 75. The cooperative returning mechanism 77 cooperates with the returning mechanism 76 to convey the recording medium P towards the regulation stopper 75. The lateral restriction members 78 align conveyance direction left-right sides of the recording medium P.

The returning mechanism 76 can vertically move into and away from the upper surface side of the processing tray 73. The returning mechanism 76 of this embodiment includes a swing bracket 81 that swings up and down about the conveyance rear end side, and a rotation roller 82 axially supported to a free end side (conveyance forwarding end) of the swing bracket 81 to be capable of rotating back and forth. When a rotation electric motor (not illustrated) is driven to rotate the rotation roller 82 counterclockwise in FIG. 10, the recording medium P is transferred to the regulation stopper 75 side, and when the motor is driven to rotate the rotation roller 82 clockwise in FIG. 10, the recording medium P is conveyed to the stack tray 74 side. To perform the post processing, the swing bracket 81 descends with a predetermined number of recording media P is stacked over the processing tray 73 and the stack tray 74 so that the rotation roller 82 comes in contact with the upper surface of the uppermost recording media P. A driven roller 83 is disposed on the processing tray 73 at a portion opposite the rotation roller 82.

The cooperative returning mechanism 77 is disposed between the returning mechanism 76 and the regulation stopper 75. The cooperative returning mechanism 77 of this embodiment includes an annular belt 84 and a swing lever 85 for vertically moving the belt 84 in accordance with the thickness of the stacked recording media P. A base end side (upper end side) of the swing lever 85 is rotatably axially supported by a shaft of the lower one of the pair of conveyance rollers 71 on the most downstream side (hereinafter referred to as a lower conveyance roller 71). End sides of the belt 84 are respectively wound around the lower conveyance roller 71 and a free end side (distal end side) of the swing lever 85. The belt 84 rotates counterclockwise in FIG. 10 in conjunction with the rotation of the lower conveyance roller 71. The swing lever 85 swings by its own weight about the shaft of the lower conveyance roller 71.

The lateral regulation members 78 are of a left and right pair that perform position control by aligning lateral ends of the recording media P having the conveyance rear end sides aligned by the regulation stopper 75 to a center reference or side reference. For the position control to the center reference, the left and right pair of lateral regulation members 78 simultaneously move close to or away from one another. For the position control to the side reference, one of the lateral regulation members 78 is fixed and the other one of the lateral regulation members 78 moves in left-right direction. In both cases, the left and right pair of lateral regulation members 78 sandwich the recording medium P on the processing tray 73 from left-right sides. Thus, the recording media P of any standard are set to the desired reference.

A post processing unit that performs the post processing on the conveyance rear end side of the recording medium P having the position controlled by the regulation stopper 75 is disposed more on the rear side than the regulation stopper 75. In this embodiment, the inner finisher 70 is of a type that executes stapling processing, and thus the post processing unit is a stapler unit 90. Although not elaborated in the figures, the stapler unit 90 presses U-shaped staples coupled to form a strip shape into a conveyance rear end side of the bunch of recording media P by means of a driver member, tips of the inserted staple are bent by an anvil member facing the driver member, and thus the bunch of recording media P is stapled together.

The stapler unit 90 of this embodiment is movable in a direction orthogonal to the conveyance direction of the recording medium P (that is also the sheet feed width direction of the image forming unit 6 and the front-rear direction of the main body 2). Thus, the stapler unit 90 staples a plurality of portions on the side of the recording medium P orthogonal to the conveyance direction. The post processing unit may also be a puncher unit for the punching processing or a unit capable of executing both stapling processing and the punching processing.

In the configuration, to print the recording medium P of A4 size (hereinafter referred to as a maximum size recording medium Pmax) and perform post processing on the longer side, the user performs an input operation on the operation panel 9 to select the maximum size recording medium Pmax and the printing processing is started. The maximum size recording medium Pmax to be printed is conveyed in the shorter side direction (lateral feeding) as described above. Thus, the printed maximum size recording medium Pmax is laterally fed to the post processing path R3 of the inner finisher 70 from the main conveyance path R0 on the main body 2 side. Then, the maximum size recording media Pmax have the one longer side (conveyance direction rear end side) abutted on the regulation stopper 75 to be aligned, and both shorter sides aligned by the pair of lateral regulation members 78. Then, when a predetermined number of the maximum size recording media Pmax are stacked on the processing tray 73, a plurality of portions on one longer sides of the bunch of the maximum size recording media Pmax orthogonal to the conveyance direction are stapled (see FIG. 11A).

To perform post processing on the shorter sides of the printed the maximum size recording media Pmax, the maximum size recording media Pmax are disposed on the bypass tray 35 in advance to be fed with the shorter side first (longitudinal feeding), the user performs an input operation on the operation panel 9 to select the maximum size recording medium Pmax on the bypass tray 35 and the printing processing is started. Here, the maximum size recording medium Pmax is conveyed along the longer side direction (longitudinal feed). Thus, the printed maximum size recording media Pmax are longitudinally fed to the post processing path R3 from the main conveyance path R0. Then, the maximum size recording media Pmax have one shorter side (conveyance direction rear end side) abutted on the regulation stopper 75 to be aligned, and both longer sides aligned by the pair of lateral regulation members 78. Then, when a predetermined number of the maximum size recording media Pmax are stacked on the processing tray 73, a plurality of portions on one shorter sides of the bunch of the maximum size recording media Pmax orthogonal to the conveyance direction are stapled (see FIG. 11B). Here, the bypass tray 35 is the sub feeder.

As apparent from the above description, in the image forming system of this embodiment (combination of the MFP 1 and the inner finisher 70), any one of the feeder 7 and the bypass tray 35 are selected as the feeding source of the maximum size recording media Pmax respectively for executing the post processing on the longer sides of the maximum size recording media Pmax and on the shorter sides of the maximum size recording media Pmax. Thus, the post processing can be executed on both longer sides and shorter sides of the maximum size recording media Pmax only with the inner finisher 70 of a simple type that performs the post processing only on the side (side along the sheet feed width direction) of the printed recording medium P orthogonal to the conveyance direction. Thus, the increase in cost and size can be prevented, and the image forming system is a user friendly system.

Particularly, the inner finisher 70 of this embodiment can be added on in such a manner as to be embedded in the discharged sheet reservoir 8 between the image reader 5 and the image forming unit 6. Thus, the inner finisher 70 can be prevented from sticking out of the occupation area of the MFP 1 as much as possible. This is effective in terms of space saving with the image forming system.

In this embodiment, the bypass tray 35 is employed as the sub feeder. However, the sub feeder is not limited to the bypass tray 35, and an optional external feeder 91 (see FIG. 11B) can be employed for example. The external feeder 91 can accommodate about several thousands of recording media P for example, and is coupled to the main body 2 from which the bypass tray 35 is removed. The recording media P in the external feeder 91 are longitudinally fed to the main conveyance path R0 through a manual sheet feed path R1'. The post processing unit (stapler unit 90), which is movable in the direction (sheet width direction of the image forming unit 6 and the front-rear direction of the main body 2) orthogonal to the conveyance direction of the recording medium P, may be movable in the conveyance direction of the recording medium P. In this case, the regulation stopper 75 is disposed on one side of the conveyance lateral direction in the inner finisher 70, and one conveyance direction lateral ends of the recording media P are abutted on the regulation stopper 75 to be aligned.

It will be appreciated that the present invention will not be limited to this embodiment described above and can be embodied in various other forms. For example, while the MFP 1 has been described as an exemplary image forming apparatus, this should not be construed in a limiting sense. Other possible examples include printers.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An image forming system comprising:
   an image forming apparatus and a post processing apparatus,
   wherein said image forming apparatus includes:
      a main body;
      at least one feeder disposed within the main body, said at least one feeder having a longer side direction orthogonal to a conveyance direction of a recording medium, and being configured to feed a maximum size recording medium of a maximum size to be accommodated with a longer side first, wherein, said at least one feeder cannot accommodate the maximum size recording medium with the longer side of the maximum size recording medium parallel to the conveyance direction thereof, and all recording media accommodated in the main body are accommodated only in said at least one feeder;
      an image forming unit having a maximum sheet feed width corresponding to the longer side length of the maximum size recording medium, and configured to print a toner image corresponding to digital image data onto the maximum size recording medium; and
      a sub feeder disposed on an external side of the main body and configured to externally feed a maximum size recording medium to the image forming unit independently from the at least one feeder disposed within the main body, wherein the orientation of the maximum size recording medium in the sub feeder with respect to the conveyance direction is different from the orientation of the maximum size recording medium in the at least one feeder;
   wherein said post processing apparatus is configured to receive a printed maximum size recording medium and execute post processing on any one of a side of the maximum size recording medium orthogonal to the conveyance direction and a side of the maximum size recording medium parallel to the conveyance direction, and
   wherein one of the at least one feeder and the sub feeder is selectable as a feeding source of the maximum size recording medium for executing the post processing on the longer side of the maximum size recording medium and executing the post processing on a shorter side of the maximum size recording medium.

2. The image firming system according to claim 1, wherein the post processing apparatus is capable of executing at least one of stapling processing of stapling the maximum size recording medium and punching processing of punching a hole in the maximum size recording medium.

3. The image forming system according to claim 1, wherein the image forming apparatus further comprises:
   an image reader disposed above the image forming unit in such a manner as to allow a longer side direction of a maximum size document of a maximum size to be placed on a platen to be orthogonal to a sheet feed width direction of the image forming unit and the longer side direction of the at least one feeder, and
   a discharged sheet reservoir where the printed maximum size recording medium is discharged disposed between the image reader and the image forming unit,
   wherein the post processing apparatus is capable of being added on in the discharged sheet reservoir in an embedded manner.

4. The image forming system according to claim 1,
wherein the at least one feeder comprises a removable sheet feed cassette,
wherein the maximum size recording medium is configured to be accommodated within a frame body of the sheet feed cassette, and
wherein a length of the frame body in the conveyance direction of the maximum size recording medium is smaller than a length of the frame body in a direction orthogonal to the conveyance direction.

5. The image forming system according to claim 1, wherein the sub feeder comprises a retractable bypass tray as a manual feeder.

6. An image forming apparatus comprising:
a main body;
an image forming unit configured to form an image on a recording medium;
at least one feeder within the main body configured to feed the recording medium to the image forming unit, wherein said at least one feeder cannot accommodate a maximum size recording medium with a longer side direction of the maximum size recording medium parallel to a conveyance direction thereof, and all recording media accommodated in the main body are accommodated only in said at least one feeder;
a sheet feed cassette removable from the at least one feeder and configured to accommodate the maximum size recording medium with a length in a direction along the feeding direction being shorter than a length in a direction orthogonal to the feeding direction;
a manual feeder disposed on an external side of the main body and comprising a bypass tray configured to feed a maximum size recording medium to the image forming unit, wherein (i) the manual feeder has a length, in a direction orthogonal to the feeding direction, that is equivalent to a length of the at least one feeder in a direction orthogonal to the feeding direction and (ii) in the manual feeder, the orientation of the maximum size recording medium with respect to the feeding direction is different from an orientation of the maximum size recording medium in the at least one feeder; and
a post processing unit configured to execute post processing on maximum size recording media on which an image is formed by the image forming unit.

7. The image forming apparatus according to claim 6, wherein the post processing unit executes the post processing on a side of maximum size recording media orthogonal to the conveyance direction.

8. The image forming apparatus according to claim 7, wherein the post processing unit comprises a stapler.

9. A post processing method for executing post processing on the printed maximum size recording medium using the image forming system according to claim 1, the method comprising:
causing the post processing apparatus to execute the post processing on a side of the maximum size recording medium orthogonal to the conveyance direction;
laterally feeding the maximum size recording medium from the at least one feeder to execute the post processing on the longer side of the maximum size recording medium; and
longitudinally feeding the maximum size recording medium from the sub feeder to execute the post processing on the shorter side of the maximum size recording medium.

10. An image forming system comprising:
an image forming apparatus and a post processing apparatus,
wherein said image forming apparatus includes:
a main body;
a plurality of feeders disposed within the main body, each feeder of said plurality of feeders having a longer side direction orthogonal to a conveyance direction of a recording medium, and being configured to feed a maximum size recording medium of a maximum size to be accommodated with a longer side first, wherein each feeder of said plurality of feeders cannot accommodate the maximum size recording medium with the longer side of the maximum size recording medium parallel to the conveyance direction thereof;
an image forming unit having a maximum sheet feed width corresponding to a longer side length of the maximum size recording medium, and configured to print a toner image corresponding to digital image data onto the maximum size recording medium; and
a sub feeder disposed on an external side of the main body and configured to externally feed a maximum size recording medium to the image forming unit independently from the plurality of feeders disposed within the main body, wherein the orientation of the maximum size recording medium in the sub feeder with respect to the conveyance direction is different from the orientation of the maximum size recording medium in the plurality of feeders;
wherein said post processing apparatus is configured to receive a printed maximum size recording medium and execute post processing on any one of a side of the maximum size recording medium orthogonal to the conveyance direction and a side of the recording medium parallel to the conveyance direction, and
wherein one of the plurality of feeders and the sub feeder is selectable as a feeding source of the maximum size recording medium for executing the post processing on the longer side of the maximum size recording medium and executing the post processing on a shorter side of the maximum size recording medium.

11. The image firming system according to claim 10, wherein the post processing apparatus is capable of executing at least one of stapling processing of stapling the maximum size recording medium and punching processing of punching a hole in the maximum size recording medium.

12. The image forming system according to claim 10, wherein the image forming apparatus further comprises:
an image reader disposed above the image forming unit in such a manner as to allow a longer side direction of a maximum size document to be placed on a platen to be orthogonal to a sheet feed width direction of the image forming unit and a longer side direction of the feeder, and
a discharged sheet reservoir, where the printed maximum size recording medium, is discharged disposed between the image reader and the image forming unit,
wherein the post processing apparatus is capable of being added on in the discharged sheet reservoir in an embedded manner.

13. The image forming system according to claim 10,
wherein the feeder comprises a removable sheet feed cassette,
wherein the maximum size recording medium is configured to be accommodated within a frame body of the sheet feed cassette, and wherein a length of the frame body in the conveyance direction of the maximum size recording medium is smaller than a length of the frame body in a direction orthogonal to the conveyance direction.

14. The image forming system according to claim 10, wherein the sub feeder comprises a retractable bypass tray as a manual feeder.

15. A post processing method for executing post processing on the printed maximum size recording medium using the image forming system according to claim 10, the method comprising:
  causing the post processing apparatus to execute the post processing on a side of the maximum size recording medium orthogonal to the conveyance direction;
  laterally feeding the maximum size recording medium from a feeder of the plurality of feeders to execute the post processing on the longer side of the maximum size recording medium; and
  longitudinally feeding the maximum size recording medium from the sub feeder to execute the post processing on the shorter side of the maximum size recording medium.

\* \* \* \* \*